(12) United States Patent
Hutton et al.

(10) Patent No.: US 11,177,811 B2
(45) Date of Patent: Nov. 16, 2021

(54) CLOCK SYNTHESIS FOR FREQUENCY SCALING IN PROGRAMMABLE LOGIC DESIGNS

(71) Applicant: Intel Corporation, Santa Clara, CA (US)

(72) Inventors: Michael D. Hutton, Mountain View, CA (US); Audrey Kertesz, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 900 days.

(21) Appl. No.: 15/719,289

(22) Filed: Sep. 28, 2017

(65) Prior Publication Data
US 2019/0097637 A1  Mar. 28, 2019

(51) Int. Cl.
| | | |
|---|---|---|
| H03L 7/08 | (2006.01) | |
| H03K 5/135 | (2006.01) | |
| G06F 30/34 | (2020.01) | |
| G06F 30/331 | (2020.01) | |
| H03L 7/22 | (2006.01) | |
| G06F 30/396 | (2020.01) | |

(52) U.S. Cl.
CPC .......... *H03L 7/08* (2013.01); *G06F 30/331* (2020.01); *G06F 30/34* (2020.01); *H03K 5/135* (2013.01); *G06F 30/396* (2020.01); *H03L 7/22* (2013.01)

(58) Field of Classification Search
None
See application file for complete search history.

(56) References Cited

U.S. PATENT DOCUMENTS

| | | | | |
|---|---|---|---|---|
| 5,122,677 | A * | 6/1992 | Sato ................. | H04J 3/0688 |
| | | | | 327/147 |
| 9,218,018 | B2 * | 12/2015 | Vahidsafa ............ | G06F 1/10 |
| 10,642,336 | B2 * | 5/2020 | Kommrusch ......... | G06F 1/324 |
| 2003/0098730 | A1 * | 5/2003 | Miyazaki ............ | H03L 7/07 |
| | | | | 327/158 |
| 2016/0036320 | A1 * | 2/2016 | Crandall ............. | H02M 3/07 |
| | | | | 455/77 |
| 2016/0267266 | A1 * | 9/2016 | Yamamoto .......... | H04L 9/3278 |

OTHER PUBLICATIONS

"Phase-locked loop", Wikipedia, https://en.wikipedia.org/wiki/Phase-locked_loop, accessed Mar. 2017, 17 pages.

(Continued)

*Primary Examiner* — Cassandra F Cox
(74) *Attorney, Agent, or Firm* — Fletcher Yoder, PC (57) ABSTRACT

Systems and methods described herein are related to clock signal generation for synchronous electronic circuitry. Power management in electronic devices circuitry may be implemented by scaling the frequency multiple functional modules implemented in the synchronous electronic circuitry. The present disclosure discussed clock generators that may provide frequency scaling of clock signals for functional modules within an electronic device. Moreover, certain clock signal generators may reduce mitigate generation of large currents during frequency scaling by employing circuitry that leads to incremental frequency changes. Circuitry that allows substantially glitchless or reduced-glitch transition between clock rate frequencies are also discussed.

20 Claims, 6 Drawing Sheets

(56) References Cited

OTHER PUBLICATIONS

"IOPLL Intel® FPGA IP Core User Guide", Intel, accessed Mar. 2017, 13 pages.
"AN 728: I/O PLL Reconfiguration and Dynamic Phase Shift for Intel® Arria® 10 and Intel Cyclone® 10 GX Devices", Intel, accessed Mar. 2017, 17 pages.
"Clock Control Block (ALTCLKCTRL) IP Core User Guide", Altera, accessed Mar. 2017, 32 pages.
"Fractional PLLs", https://www.altera.com/products/fpga/features/stxv-fpll.html, published Jan. 9, 2017, 6 pages.
"Intel® Arria® 10 Core Fabric and General Purpose I/Os Handbook", Intel, accessed Mar. 2017, 336 pages.
"Intel® Arria® 10 Transceiver PHY User Guide", Intel, accessed Mar. 2017, 616 pages.
Rafey Mahmud, "Techniques to make clock switching glitch free", EE Times, published Jun. 26, 2003, 6 pages.
Andrew Putnam et al., "A Reconfigurable Fabric for Accelerating Large-Scale Datacenter Services", IEEE, published 2014, 12 pages.
Kalin Ovtcharov et al., "Accelerating Deep Convolutional Neural Networks Using Specialized Hardware", published Feb. 22, 2015, 4 pages.

\* cited by examiner

CLOCK SYNTHESIS FOR FREQUENCY SCALING IN PROGRAMMABLE LOGIC DESIGNS

BACKGROUND

This disclosure relates to clock management in electronic circuitry, and more specifically, to systems and methods that allow synthesis for logic circuitry having flexible frequency scaling for electronic devices.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

In many electronic devices, such as in application-specific integrated circuits (ASICs) and programmable logic devices (PLDs), many of the tasks performed may be divided into multiple functional modules. In some implementations, the operation of functional modules may be affected by the frequency of the clock signal that drives each functional module. For example, certain co-processing accelerators may allow higher data throughput when receiving a high-frequency clock signal, and may consume less energy resources when receiving a low-frequency clock signal. In another example, integrated circuitry in portable electrical devices may use low-frequency clock signals in hot environments to reduce the amount of heat produced by the circuitry and prevent overheating of the electrical device. More generally, management of the frequency of the clock signals provided to the functional modules may allow flexibility in power management and operation of the electronic devices. Changing the clock frequency (e.g., clock scaling) during operation of the electronic device may, however, lead to undesired behavior. Some solutions that employ dynamic reconfiguration of oscillating circuitry (e.g., phase-locked loops) may require a downtime until the oscillating circuitry stabilizes to the new frequency (e.g., the loop locks). Moreover, the changes in frequency may be significant, and the large increments in the clock frequency may lead to very large currents, which may consume excessive power during the modification.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

Many electronic devices may include integrated circuits devices, such as application-specific integrated circuits (ASICs) or programmable logic devices (PLDs) that may implement many functions using synchronous logic circuitry. The functions may be performed by functional modules or functional units that may receive a clock signal to determine the speed (e.g., throughput, processing power) of the functional module. As an example, a field-programmable gate array (FPGA) may have a custom logic region that implements a specific function (e.g., fast Fourier transform, encryption, packet processing) as a method to accelerate a programmable function using hardware. The clock signal that drives operation of a functional module may determine the speed of operation. The higher the frequency, the more data can be processed per unit of time by the functional module. The lower the frequency, the less energy may be consumed by the functional module.

Clock signals employed by the functional modules of the integrated signals may be implemented by oscillating circuitry (e.g., phase-locked loop, or PLL; a digitally locked loop, or DLL), and the frequency of the clocks may be generated during circuit synthesis. As such, once in operation, the clock frequency may be fixed. Frequency scaling (i.e., alterations in the frequency) may take place by reconfiguring oscillating circuitry, but this procedure may generate high currents and violate power constraints for the functional module during the transition. Reconfiguration of the oscillating circuitry may also require a downtime while the clock signal is not yet stable. For example, following a change in a register or a phase-locked loop, a time for loop locking may be used. Embodiments described herein describe circuitry and methods that may be used to provide frequency scaling with smooth transitions, quick convergence, and low currents during the transition. Certain embodiments may include gate circuitry and/or latch-based memories to provide glitchless transition between clocks. Certain embodiments may include incremental changes in the frequency rate to reduce the currents during frequency changes. Certain embodiments may include memory to store multiple configurations for the oscillating circuitry. Control circuitry that may sense environmental and/or power conditions to scale the frequency of the functional modules are also described.

Figure 1:
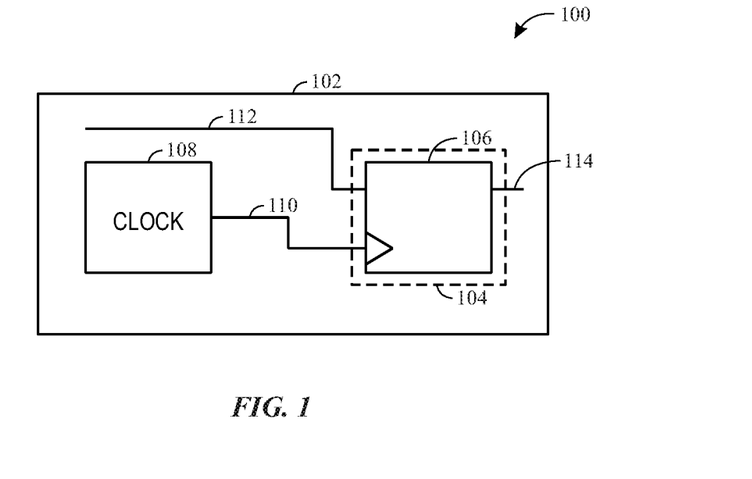
FIG. 1 is a schematic diagram an electronic device that may employ the frequency scaling to adjust operation of functional modules, in accordance with an embodiment.

With the foregoing in mind, diagram 100 in FIG. 1 illustrates an integrated circuit 102. Integrated circuit 102 may be an application specific integrated circuit (ASIC) that implements, for example, a hardened logic processor. Integrated circuit 102 may also be a programmable logic device (PLD), such as a field programmable gate array (FPGA). Integrated circuit 102 may also be a hybrid device that includes hard (e.g., fixed) circuitry and soft (e.g., custom, programmable) circuitry. Integrated circuit 102 may have a functional module 104 that includes synchronous logic elements 106. Functional module 104 may be, for example, a custom logic, a soft intellectual property (IP) block, a hard IP block, a vendor provided module, a co-processor, or any other circuitry that includes synchronous logic 106. While the illustrated example includes a single logic element 106, it should be understood that functional module 104 may have many logic elements arranged to perform the specified task, and further, that it may employ many different clocks 108. Functional module 104 may also receive from a clock 108 a clock signal 110, which may be coupled to clock ports of synchronous logic elements 106. Furthermore, functional module 104 may receive input 112 and provide output 114 during performance of its functions. As discussed above, the frequency of clock signal 110 may be adjusted to increase the processing power of functional module 104, to save resources in integrated circuit 102, or to compensate for environmental conditions of integrated circuit 102, as detailed below.

Figure 2:
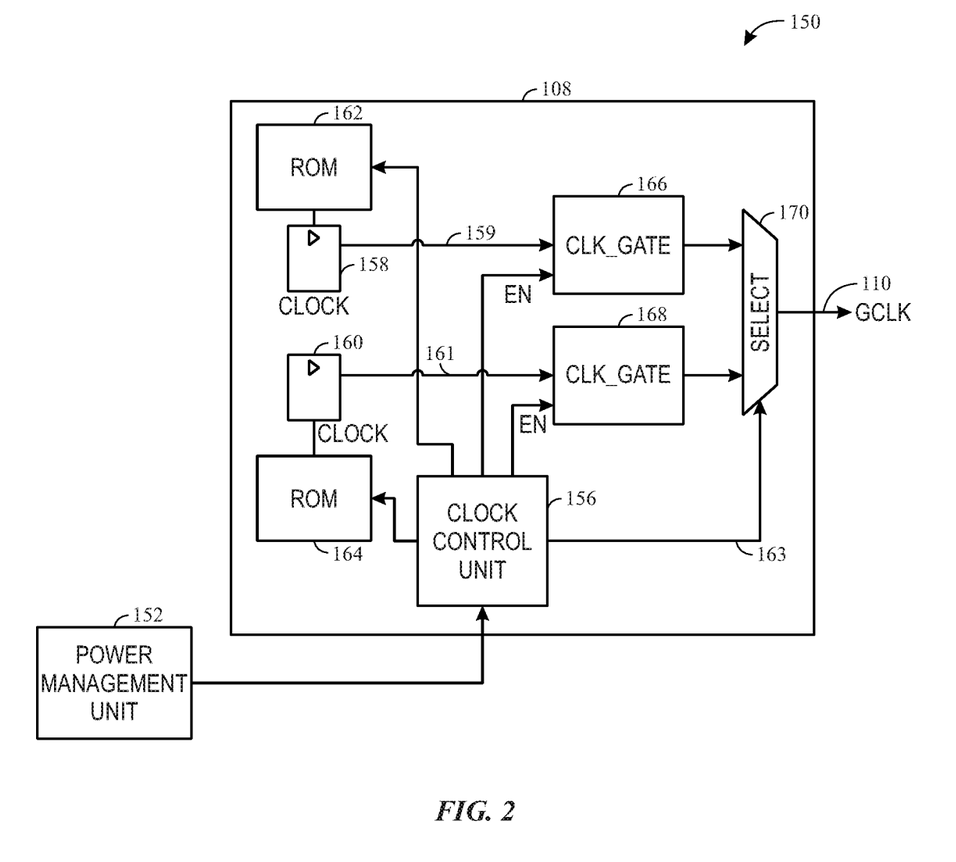
FIG. 2 is a schematic diagram of clock providing circuitry that may be used for frequency scaling and management of operations, in accordance with an embodiment.

The diagram 150 in FIG. 2 illustrates an implementation of a clock 108 that is capable of performing frequency scaling. Clock 108 may be controlled by power management circuitry 152. Power management circuitry 152 may be located inside clock 108 or may be external to clock 108, as illustrated. Power management circuitry 152 may be capable of providing to clock 108 commands and/or instructions to increase or decrease the frequency of clock signal 110. Power management circuitry 152 may be capable of providing a target frequency for power clock 108. Commands from power management circuitry 152 may be received by clock control unit 156. Clock control unit 156 may be implemented as a hard IP or as soft IP.

The clock 108 may include clock generators (e.g., clocks) 158 and 160. Clock 158 may produce an internal clock signal 159 and clock 160 may produce an internal clock signal 161. Clocks 158 and/or 160 may be implemented using PLLs or any other configurable clock or oscillating circuitry. For example, if clocks 158 and 160 are implemented using PLLs, certain registers in the PLL feedback loop of clocks 158 and 160 may be modified to change the frequency of the internal clock signals 159 and 161, respectively. The configuration of internal registers of clocks 158 and 160 may be stored in memory circuitries attached to the clocks. For example, clock 158 may be coupled to a read-only memory (ROM) 162 that stores configurations to change the frequency of internal clock signal 159. Similarly, clock 160 may be coupled to a ROM 164 that stores configurations to change the frequency of internal clock 161. The clock control unit 156 may adjust the frequency of clock signals 159 and 161 by selecting one of the configurations stored in ROMs 162 and/or 164. The configurations of the ROMs 162 and 164 may be generated during the synthesis of the integrated circuit 102.

Internal clock signal 159 may be gated by a clock gate 166, and internal clock signal 161 may be gated by a clock gate 168. Clock control unit 156 may control clock gates 166 and 168. In some implementations, the control clock control unit 156 may operate based on the stability of clocks 158 and 160. For example, clock gate 166 may be gated off prior to a reprogramming of clock 158, and gated on once internal clock signal 159 is stable and has the frequency requested by clock control unit 156. Furthermore, a selection gate 170 may be employed to select which clock signal is provided by clock 108 as the output clock signal 110. Note that during regular operation (e.g., when the clock frequency is constant), frequency of clock signal 110 remains constant and is provided by either clock 158 or clock 160. Clock control unit 156 may shutdown the unused clock to save energy until a frequency scaling is requested. Consider, for example, a situation in which clock 158 is generating the clock signal 110 at an initial clock frequency and clock 160 is turned off. Clock control unit 156 may receive instructions to transition clock signal 110 to a higher frequency. Clock control unit 156 may then turn on clock 160 and select the requested frequency from ROM 164. Once clock 160 provides the a stable clock signal at the requested frequency, clock control unit 156 may enable clock gate 168 and adjust the selection gate 170 to switch clock signal 110 from the path from clock gate 166 to the path from clock gate 168. Clock control unit 156 may then disable clock gate 166 and shut down clock 158.

Clock control unit 156 may also monitor clock signals 159 and 161 during the transition, to prevent glitches from happening. Glitches in the transition may occur when the two clock signals collide are not aligned at the moment of transition, resulting in a transition clock cycle that may be out-of-phase and/or may appear as a very high frequency artifact. Synchronous circuitry receiving clock signal 110 may not be designed to be robust to such glitches, which may lead to large currents, logic hazards and/or racing conditions that may prevent a functional module from operating correctly. Clock control unit 156 may, thus, monitor clock signals 159 and 161, and control selection gate 170 to switch during a moment where there is phase and/or state matching between clock signals 159 and 161. Control of the output may be provided by the clock control unit 156 through a selection signal 163. While the above systems include two oscillating circuitries, clock generators may be adapted to include multiple oscillating circuitries.

Figure 3A:
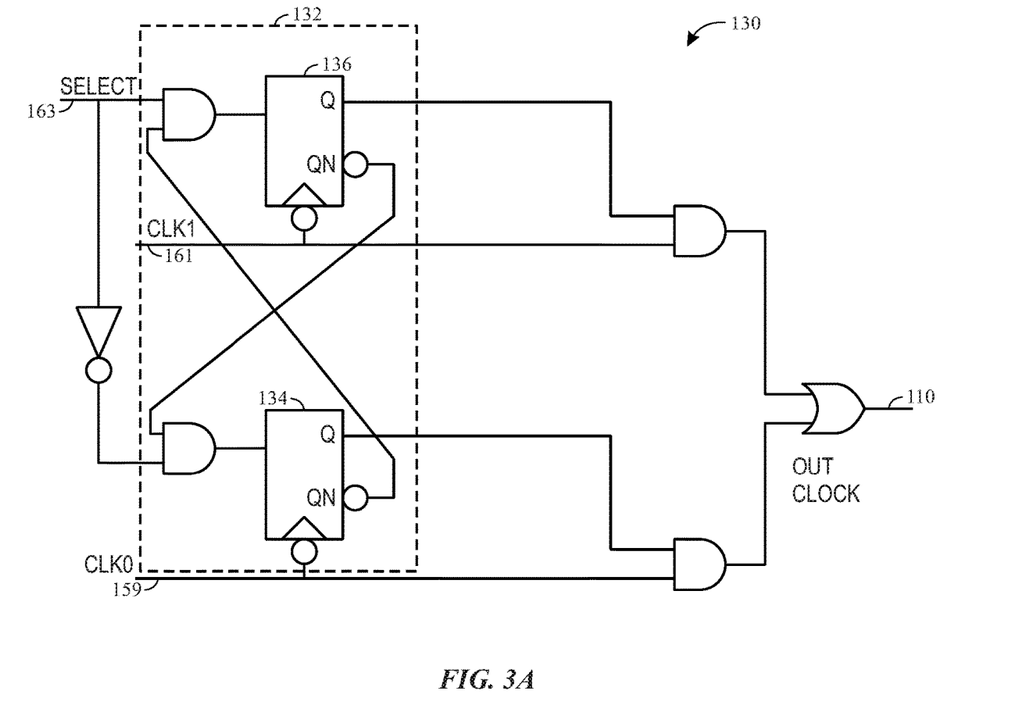
FIG. 3A is a schematic diagram of another clock signal selection circuit that may be used with the clock providing circuitry of FIG. 2, in accordance with an embodiment.

Electrical diagram 130 illustrated in FIG. 3A provides a clock switching circuitry 132 that may be used to provide glitchless transition between two clocks, as controlled by clock control unit 156. The circuit described in diagram 130 may be used in situations where the frequency of clock signal 159 and clock signal 161 may be integer-related clocks (i.e., the frequencies are related by an integer multiplier). The clock switching circuitry 132 may have two flip-flops 134 and 136 that may be arranged in a feedback circuitry that operates as a memory of the clock signal selection. During operation, if the select signal is a logic 0, the stable output of flip-flop 134 is 1 and the stable output of flip-flop 136 is 0, resulting in clock 108 transmitting internal clock signal 159. In contrast, if the select signal is a logic 1, the stable output of flip-flop is 0 and the stable output of flip-flop 134 is 1, resulting in clock 108 transmitting internal clock signal 161.

Figure 3B:
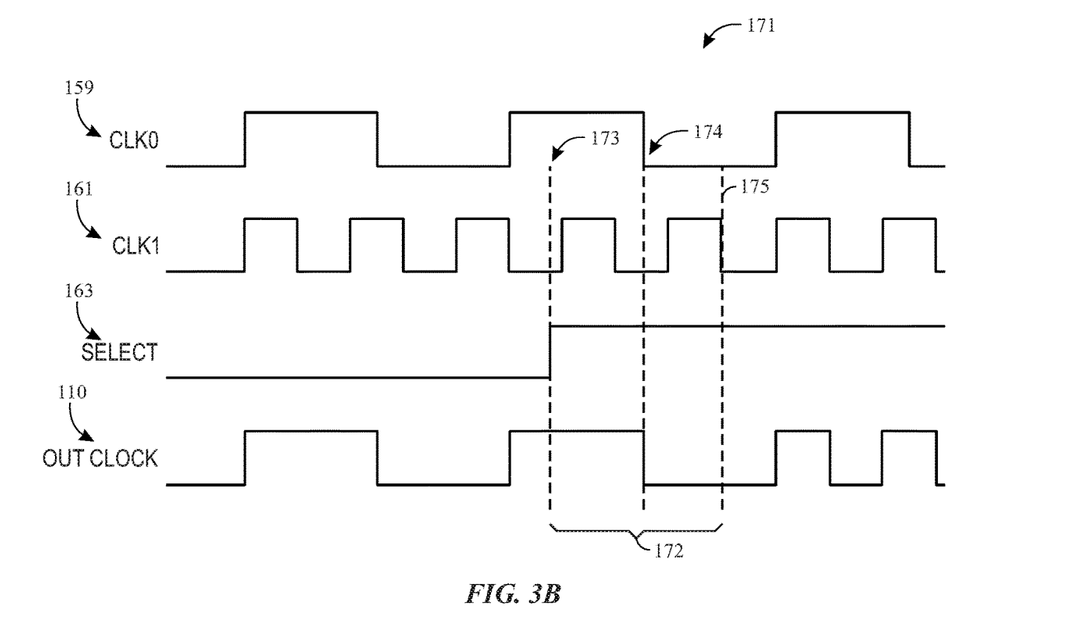
FIG. 3B is a chart that illustrates glitchless operation of the clock signal selection circuitry of FIG. 3A, in accordance with an embodiment.

Note, moreover, that both flip-flops 134 and 136 are clocked by internal clock signals 159 and 161, respectively. As a result, the transition of the states occurs as clocked by the corresponding flip-flop. For example, if flip-flops 134 and 136 are edge-triggered flip-flops, the transition from one clock will take place following the first negative edge of the clock signals 159 and 161 that follow the change in the select signal 163. Chart 171 in FIG. 3B illustrates this operation by means of an example. Initially (e.g., prior to transition region 172), select signal 163 is a logic 0 and, therefore, the output clock signal 110 follows the first internal clock signal 159. At time 173, the select signal 163 switches to a logic 1, indicating that clock switch circuitry 132 should provide the second internal clock signal 161 as the output clock signal 110. The select signal 163 may then become input to flip-flop 134. At time 174, flip-flop 134 may be triggered by the first negative edge of clock signal 159 and latch the new select signal. This results in flip-flop 134 providing an output of 0 that gates clock signal 159 from the output clock signal 110. Moreover, the inverted output of flip-flop 134 becomes 1 gating off the select signal 163 from the input of flip-flop 136. At time 175, flip-flop 136 may be triggered by the negative edge of clock signal 161 and latch the new select signal input. Output of flip-flop signal 136 becomes 1 at time 175, which gates off the clock signal 161 from the output clock signal 110.

Figure 4A:
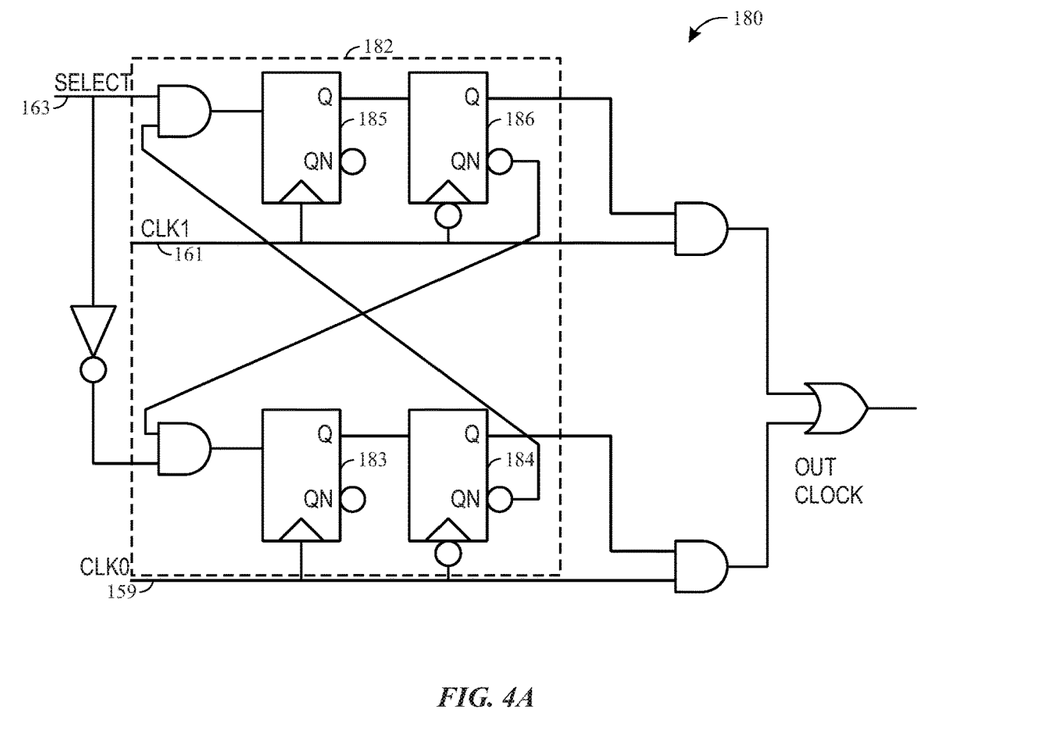
FIG. 4A is a schematic diagram of an another clock signal selection circuit that may be used with the clock providing circuitry of FIG. 2, in accordance with an embodiment.

The illustrated electrical diagram 180 in FIG. 4A provides a clock switching circuitry 182 that may be controlled by the clock control unit 156 of FIG. 2, and may be used when the two internal clock signals 159 and 161 are unrelated. The clock switching circuitry 182 may operate using a principle of operation that is similar to clock switching circuitry 132 illustrated above. However, the in this circuit, the flip-flop memory node (e.g., memory path) employs synchronization registers, which may be flip-flops arranged in two stages. For example, the memory path that regulates gating of internal clock signal 159 includes a first flip-flop 183 and a second flip-flop 184. Similarly, the memory path that regulates gating of internal clock 161 includes a first flip-flop 185 and a second flip-flop 186. The first flip-flop in the sequence may provide a stable output for the second flip-flop, decreasing the possibility of meta-stability that may occur during the transition. For example, if flip-flops 183 and 184 are edge triggered, the memory path will only switch the output and adjust gating of internal clock signal 159 after a sequence that includes a positive edge that latches flip-flop 183, and a negative edge that latches flip-flop 184.

Figure 4B:
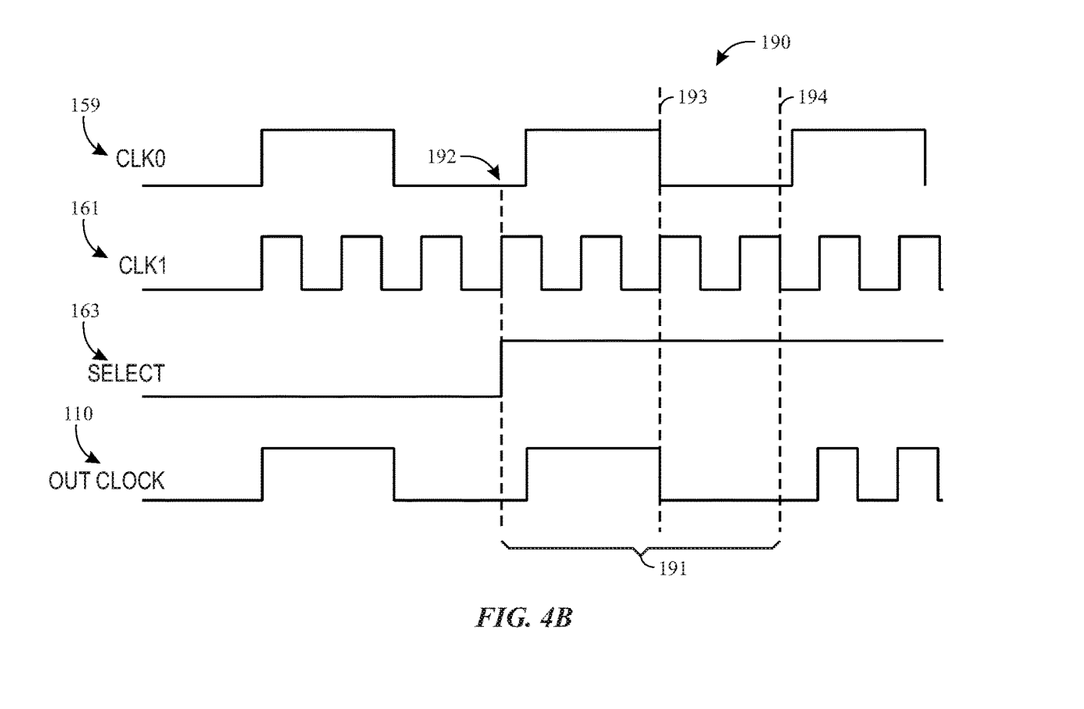
FIG. 4B is a chart that illustrates glitchless operation of the clock signal selection circuit of FIG. 4A, in accordance with an embodiment.

Chart 190 in FIG. 4B illustrates the above-described operation by way of example. Initially (e.g., prior to transition region 191), select signal 163 is a logic 0 and, therefore, the output clock signal 110 follows the first internal clock signal 159. At time 192, the select signal 163 switches to a logic 1, indicating that clock switch circuitry 182 should provide the second internal clock signal 161 as the output clock signal 110. The select signal 163 may become input to the memory path include flip-flops 183 and 184. At time 193, following a positive edge that latches flip-flop 183 and a negative edge that latches flip-flop 184, the memory path that gates clock signal 159 stores the new select signal. This results in flip-flop 184 providing an output of 0 that gates clock signal 159 from the output clock signal 110. Moreover, the inverted output of flip-flop 184 becomes 1 gating off the select signal 163 from the input of flip-flop 185. This new input is stored in the memory path at time 185, following a positive edge of clock signal 161 that latches flip-flop 185, and a negative edge of clock signal 161 that latches flip-flop 186. Output of flip-flop signal 186 becomes 1 at time 194, which gates off the clock signal 161 from the output clock signal 110, completing the transition.

Figure 5:
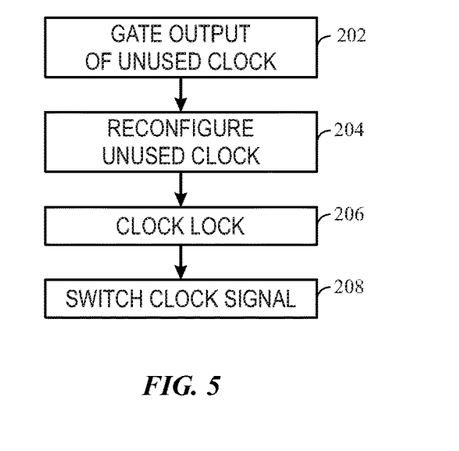
FIG. 5 is a flow chart of a method for operation of the clock providing circuitry of FIG. 2, in accordance with an embodiment.

The embodiments for the clock switching circuitry described in FIGS. 2, 3A, and 4A are not exhaustive examples for implementing clock switching circuitry, and any system and/or method for glitchless transition may be used to provide smooth frequency scaling for systems that receive clock signal 110. The method 200 illustrated in FIG. 5 illustrates a strategy that may be used by the clock 108 for smooth frequency scaling using a clock control unit. The clock control unit may have logic instructions to perform method 200 upon receiving instructions to change a frequency of the output clock signal 110. The clock control unit may be implemented as a hardware state machine. The clock control unit functions may also be performed by a microprocessor, or a microcontroller performing instructions stored in a memory device that is accessible by the clock control unit. As discussed above, clock 108 may have one clock providing the output clock signal 110 and have another unused clock, which may be turned off. In a process 202, the output of the unused clock may be gated. In a process 204, the unused clock may be configured to a desired frequency or an increment. In a process 206, the clock control unit may receive indication that the configured clock is locked (e.g., clock signal is stable). Following receiving this signal, the clock control unit may engage the clock switching circuitry to switch clock signals.

Figure 6:
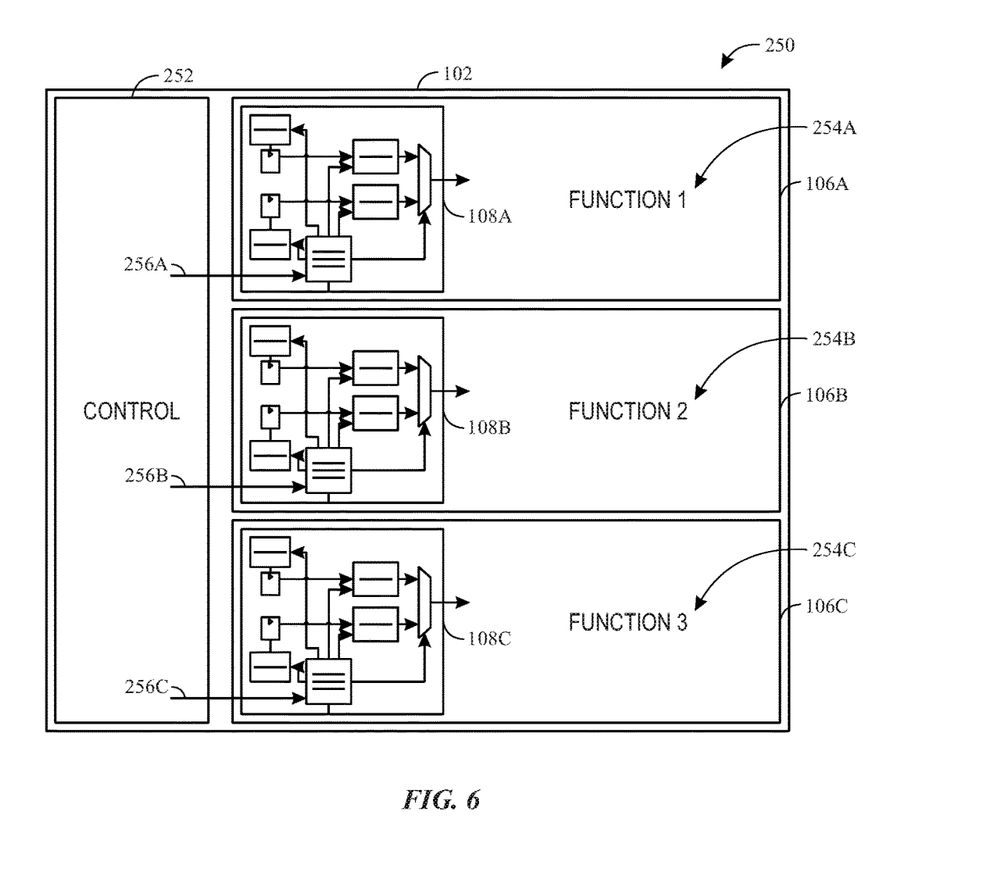
FIG. 6 is a schematic diagram of an electronic device that may employ frequency scaling circuitry to manage multiple functional modules, in accordance with an embodiment.

As discussed above, frequency scaling may be employed to manage the power consumption of multiple functional modules of a device. Diagram 250 in FIG. 6 illustrates an integrated circuit 102 that may employ frequency scaling to manage power consumption of functional modules 106A, 106B, and 106C. Functional module 106A may employ a clock 108A to drive logic circuitry 254A that may perform some "function 1." Similarly, functional module 106B may employ a clock 108B to drive logic circuitry 254B to perform a "function 2," and functional module 106C may employ a clock 108C to drive logic circuitry 254C to perform a "function 3." Functions 1, 2, and 3 may generally refer to any function that may be implemented employing synchronous logic. As an example, "function 1" may be implement a central processing unit (CPU), "function 2" may implement a co-processor that performs array multiplications that accelerate certain graphic operations, and "function 3" may implement encryption algorithms for communication purposes.

Integrated circuit 102 in FIG. 6 may also include a controller 252 that may manage the power consumption of the three functional modules 106A, 106B, and 106C, by adjusting clock rates provided by clocks 108A, 108B, and 108C. Clock 108A may be controlled using command 256A, clock 108B may be controlled using a command 256B, and clock 108C may be controlled using a command 256C. In an implementation, clocks 108A, 108B, and 108C may be configured similarly to clock 108 in FIG. 2 and commands 256A, 256B, and 256C may be received by clock control units of the respective clocks. Controller 252 may be configured to coordinate the power consumption of the three functional modules 106A, 106B, and 106C independently. Considering that controller 252 received the instruction to decrease the power of the device due to an overall reduction in energy availability. Controller 252 may make decisions on how much each of the functional modules power should be decreased. Controller 252 may further include logic and/or memory that may contain information regarding which functional modules should have its power decrease and which functional modules may be prioritized. Based on the decisions, the controller 252 may provide to the clock control units of the clocks 108A, 108B, and 108C desired clock rates and/or increments in clock frequency. Clock control units in clocks 108A, 108B, and 108C may then scale down the output clock frequency according to the received instructions. Note that clocks may employ multiple iterations of the method 200 to provide gradual scaling of frequencies, as described above. This gradual scaling may be particularly beneficial in situations in which the frequency rate of multiple functional modules since, as discussed above, it reduces the intensity of the currents during transition.

Figure 7:
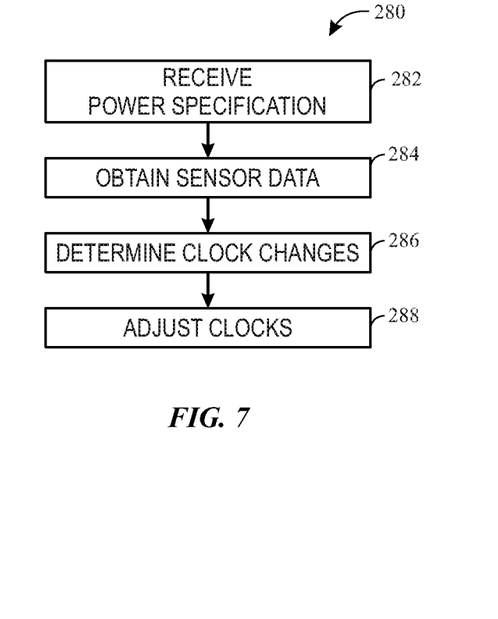
FIG. 7 is a flow chart of a method for management of resources in an electronic device that may employ frequency scaling circuitry, in accordance with an embodiment.

Controller 252 may determine the frequency scaling operation based on power specifications for the integrated circuit 102, based on information received from sensors of the electronic device, or based on external control signals (e.g., from a host processor of a datacenter system). Method 280 for operation of controller 252 illustrates an example of this process. Controller 252 may, for example, receive a power specification from the integrated circuit (process 282). The power specification may be related to an instruction by a user. For example, a user may switch the device to an energy conservation mode from a high performance mode, leading to a more conservative power specification. The power specification may also be determined based on the power source being used. For example, when the power source of the device switches from a battery to a power supply, controller 252 may receive a less conservative power specification. Controller 252 may also be capable of receiving information from sensors such as temperature and/or power sensors in the device (process 284). For example, control 252 may access a thermal sensor (e.g., a temperature sensing diode) of the device to sense environmental temperatures, such as the temperature on die or in the external environment, and adjust the processing power accordingly. If the environmental temperature increases, controller 252 may identify that situation by receiving information via a sensor and scale down the frequency to prevent overheating of the electronic device. Conversely, if the environmental temperature decreases, controller 252 may receive that information via the sensor and scale up the frequency to increase the processing power of the device. In another example, controller 252 may receive power consumption data from current sensors. Based on the received data and the power specifications, controller 252 may manage the power of functional modules 106A, 106B, and 106C by determining appropriate clock rates to satisfy the power specification (process 286). For example, if functional module 106A is causing the power of integrated circuit 102 to exceed specifications, controller 252 may decrease the request a decrease in the frequency rate of clock 108A. Based on the determined clock rates, controller 252 may send instructions to clocks 108A, 108B, and 108C as described above.

Figure 8:
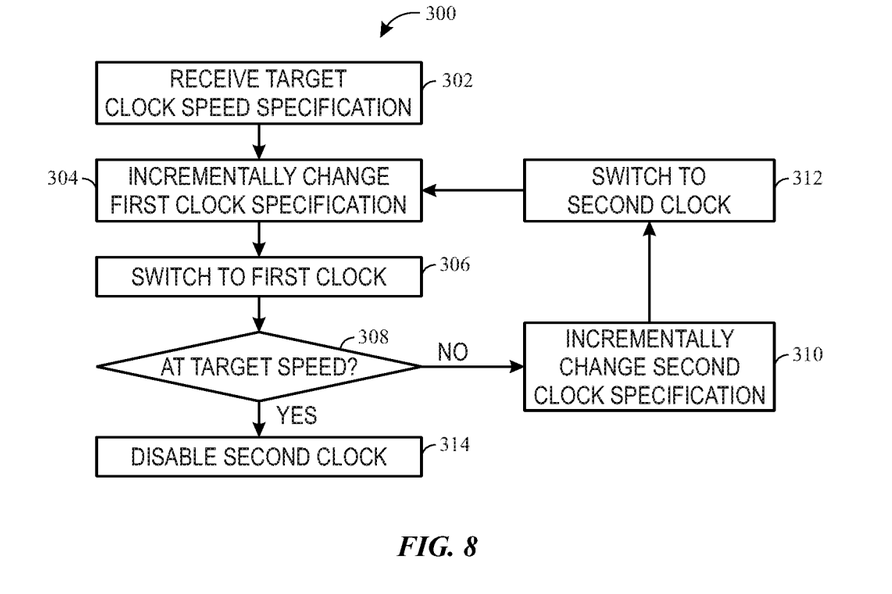
FIG. 8 is a flow chart of a method for incremental frequency scaling that may be used with the clock providing circuitry of FIG. 2, in accordance with an embodiment.

As discussed above, large changes in frequency of a clock signal may lead to large current variations in the functional module receiving the clock. As a result, large step clock signal scaling may lead to violation of the power specifications of the functional modules. To provide a more gradual change in the frequency during frequency scaling, method 200 may be repeatedly performed in "ping-pong" operation using incremental frequency differences. This "ping-pong" operation may be illustrated by method 300 in FIG. 8. Method 300 is illustrated below by means of an example of an implementation of a clock 108. In this example, ROMs 162 and 164 may store configuration words that may correspond to particular clock output frequencies. According to this example, ROM 162 may store configurations that allow a first clock 158 to produce clock signals having, for example, frequencies of 150 MHz, 250 MHz, 350 MHz, and 450 MHz. In this same example, ROM 164 may store configurations that allow a second clock 160 to produce clock signals having, for example, frequencies of 200 MHz, 300 MHz, 400 MHz, and 500 MHz. Assume that the clock signal 110 is driving a functional module 104 with a clock frequency of 500 MHz using the second clock, and assume further that the clock control unit 256 receives instruction to reduce the clock frequency to 150 MHz (process 302). Method 300 allows smooth transition between frequencies by iteratively switching the clock through smooth transitions. In a first iteration of process 304, the first clock may be adjusted to a 450 MHz frequency. The controller may switch the output (process 306) by providing the output of the first clock as the clock output and gating the second clock. As the target frequency of 150 MHz has not been reached (process 308), controller may adjust the second clock to a 400 MHz frequency (process 310). The controller may switch the output (process 312) by providing the output of the second clock as the clock output, and gating the first clock. As illustrated in method 300, iterations of processes 304, 306, 308, 310, and 312 may be performed to change the output frequency of the clock to 300 MHz, 250 MHz, 200 MHz, and to 150 MHz. Once the output clock satisfies the target speed in process 308, controller may disable the unused clock (process 314).

Figure 9:
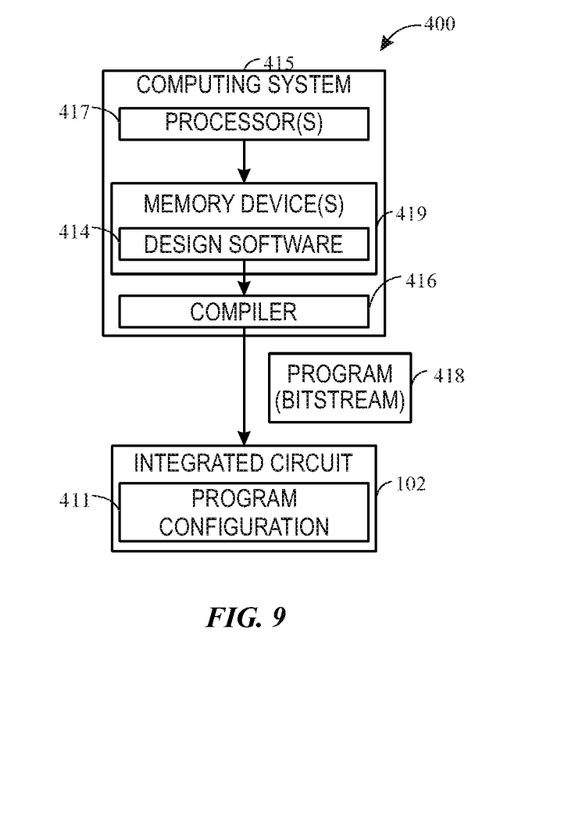
FIG. 9 is an integrated circuit system that may be used to carry out an implementation of frequency scaling circuitry to manage multiple modules, in accordance with an embodiment.

With the foregoing in mind, FIG. 9 illustrates a block diagram of a system 400 that may be used to implement the functional modules and/or the clock management circuitry discussed above onto an integrated circuit 102. The integrated circuit 102 may be reconfigurable (e.g., a field programmable gate array) or may be an application-specific integrated circuit (ASIC). A user may implement a circuit design to be programmed onto the integrated circuit 102 using design software 414, such as a version of Quartus by Intel®.

The design software 414 may be executed by one or more processors 417 of a computing system 415. The computing system 415 may include any suitable device capable of executing the design software 414, such as a desktop computer, a laptop, a mobile electronic device, a server, or the like. The computing system 415 may access, configure, and/or communicate with the integrated circuit 102. The processor(s) 417 may include multiple microprocessors, one or more other integrated circuits (e.g., application specific integrated circuits, field programmable gate arrays, reduced instruction set processors, and the like), or some combination of these.

One or more memory devices 419 may store the design software 414. In addition, the memory device(s) 419 may store information related to the integrated circuit 402, such as control software, configuration software, look up tables, configuration data, etc. In some embodiments, the processor(s) 417 and/or the memory device(s) 419 may be external to the computing system 415. The memory device(s) 419 may include a tangible, non-transitory, machine-readable-medium, such as a volatile memory (e.g., a random access memory) and/or a nonvolatile memory (e.g., a read-only memory). The memory device(s) 419 may store a variety of information and be used for various purposes. For example, the memory device(s) 419 may store machine-readable and/or processor-executable instructions (e.g., firmware or software) for the processor(s) 417 to execute, such as instructions to determine a speed of the integrated circuit 102 or a region of the integrated circuit 102, determine a criticality of a path of a design programmed in the integrated circuit 102 or a region of the integrated circuit 102, programming the design in the integrated circuit 102 or a region of the integrated circuit 102, and the like. The memory device(s) 419 may include one or more storage devices (e.g., nonvolatile storage devices) that may include read-only memory (ROM), flash memory, a hard drive, or any other suitable optical, magnetic, or solid-state storage medium, or any combination thereof.

The design software 414 may use a compiler 416 to generate a low-level circuit-design program 418 (bitstream), sometimes known as a program object file, which programs the integrated circuit 102. That is, the compiler 416 may provide machine-readable instructions representative of the circuit design to the integrated circuit 102. For example, the integrated circuit 102 may receive one or more programs 418 (bitstreams) that describe the hardware implementations that should be stored in the integrated circuit 102. The programs 418 (bitstreams) may programmed into the integrated circuit 102 as a configuration program 411.

Figure 10:
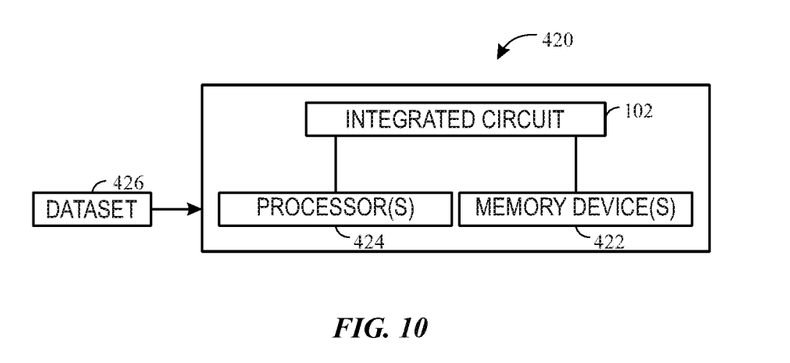
FIG. 10 is an example of an electronic system for processing datasets using multiple functional modules that may be managed with frequency scaling circuitry, in accordance with an embodiment.

As shown in FIG. 10, the integrated circuit 102 may operate in a data processing system 400 to assist in processing a dataset 126 using multiple functional modules, as discussed above. The functional modules may be managed by adjusting the clock frequencies independently, and thus, allow improved power and/or performance management of system 400. The data processing system 420 may represent, for example, a computing device in a datacenter, which may process network traffic, image data, video data, financial data, or any other suitable form of data. In some examples, the dataset 426 may be processed using a functional module that implements a machine-learning or neural-network algorithm. A processor complex 424 may execute instructions (e.g., software or firmware) stored in memory and/or storage 422 to receive and route the dataset 426 and to control the integrated circuit 102. For instance, the processor complex 424 may run software to analyze process network traffic, image data, video data, financial data, or any other suitable form of data, offloading to the integrated circuit 102 operations that are well-suited to processing by a functional module implemented on the integrated circuit 102. The memory and/or storage 422 may store the one or more programs 418 (bitstreams) that may be used to program a programmable fabric of the integrated circuit 102 (e.g., when the integrated circuit 102 is a programmable logic device, such as a field-programmable gate array or FPGA).

While the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device, comprising:
synchronous logic circuitry that receives an output clock signal from configurable clock circuitry; and
a controller coupled to the configurable clock circuitry, wherein the controller is configured to cause a scaling of a frequency of the output clock signal of the configurable clock circuitry;
wherein the configurable clock circuitry comprises a plurality of clock signal generators, and wherein scaling the frequency of the output clock signal of the configurable clock circuitry comprises:
configuring a first clock signal generator of the plurality of clock signal generators to provide a first internal clock signal having a first frequency;
providing the first internal clock signal having the first frequency as the output clock signal of the configurable clock circuitry, and determining whether the first frequency matches a target frequency;
configuring a second clock signal generator of the plurality of clock signal generators to provide a second internal clock signal having a second frequency that is incrementally higher than the first frequency;
providing the second internal clock signal having the second frequency as the output clock signal of the configurable clock circuitry, and determining whether the second frequency matches the target frequency;
in response to determining that the second internal clock signal having the second frequency does not match the target frequency, reconfiguring the first clock signal generator of the plurality of clock signal generators to provide the first internal clock signal having a third frequency that is incrementally higher than the second frequency; and
providing the first internal clock signal having the third frequency as the output clock signal of the configurable circuitry.

2. The electronic device of claim 1, wherein the electronic device comprises a field-programmable gate array.

3. The electronic device of claim 1, wherein each clock generator of the plurality of clock signal generators comprise a phase-locked loop or a digitally locked loop.

4. The electronic device of claim 1, comprising a second configurable clock and a second synchronous logic circuitry that receives a second output clock signal from the second configurable clock, wherein the controller is coupled to control circuitry of the second configurable clock, and wherein the controller is configured to cause a scaling of a frequency of the second configurable clock.

5. The electronic device of claim 1, wherein the electronic device comprises a sensor, and wherein the controller causes the frequency scaling based on a received sensor data.

6. The electronic device of claim 5, wherein the sensor comprises a temperature sensor.

7. The electronic device of claim 5, wherein the sensor comprises a current sensor.

8. The electronic device of claim 1, wherein causing the scaling of the frequency comprises requesting, by the controller, the configurable clock circuitry to increase the frequency of the output clock signal from the first frequency to a target frequency.

9. A method comprising:
receiving in a controller an instruction to change a frequency of an output clock signal provided by a configurable clock from an initial clock frequency to a final clock frequency, wherein a configurable clock generator comprises a first clock signal generator that generates a first internal clock signal at the initial clock frequency, and wherein the configurable clock provides the first internal clock signal as the output clock signal;
reconfiguring a second clock signal generator of a configurable clock to provide a second internal clock signal at a first incremental frequency;
providing the second internal clock signal as the output clock signal of the configurable clock;
reconfiguring the first clock signal generator of the configurable clock to provide the first internal clock signal at a second incremental frequency; and
providing the first internal clock signal as the output clock signal of the configurable clock,
wherein a difference between the first incremental frequency, and the second incremental frequency comprises an incremental difference.

10. The method of claim 9, wherein the incremental difference comprises less than 10% of the initial clock frequency.

11. The method of claim 9, wherein the incremental difference comprises less than 20% of a difference between the initial clock frequency and the final clock frequency.

12. The method of claim 9, wherein providing the first internal clock signal or the second internal clock signal as the output clock signal comprises providing a control signal from the controller to clock selection circuitry that receives the first internal clock signal and the second internal clock signal and provides the output clock signal based on the control signal from the controller.

13. The method of claim 12, wherein the clock selection circuitry comprises a first clock gate, a second clock gate, and a multiplexor.

14. The method of claim 12, wherein the clock selection circuitry comprises an edge triggered flip-flop.

15. The method of claim 9, wherein reconfiguring the first clock signal generator comprises selecting a configuration from a plurality of configurations stored in a memory that is coupled to the first clock signal generator.

16. The method of claim 9, wherein the first clock signal generator comprises phase-locked loop circuitry, and wherein reconfiguring the first clock signal generator comprises changing a value stored in a register of the phase-locked loop circuitry.

17. Clock generating circuitry, comprising:
first clock signal generating circuitry that provides a first internal clock signal;
second clock signal generating circuitry that provides a second internal clock signal;
clock selection circuitry that receives the first internal clock signal, the second internal clock signal; and
control circuitry configured to:
adjust a frequency of the first internal clock signal;
adjust a frequency of second internal clock signal; and
configure the clock selection circuitry to provide the first internal clock signal or the second internal clock signal as an output clock signal of the clock generating circuitry.

18. The clock generating circuitry of claim 17, comprising a first memory that stores a plurality of configurations for the first clock signal generating circuitry, and wherein adjusting the frequency of the first internal clock signal comprises selecting a configuration for the first clock signal generating circuitry that is stored in the first memory.

19. The clock generating circuitry of claim 17, wherein the first clock signal generating circuitry comprises a phase-locked loop or a digitally locked loop.

20. The clock generating circuitry of claim 17, wherein the control circuitry is configured to:
receive a target frequency rate; and
determine a series of incremental frequency rates, based on the current frequency rate and the target frequency rate.

* * * * *